Feb. 25, 1947.    H. L. THOMPSON    2,416,502
FIFTH WHEEL FOR VEHICLES
Filed Oct. 25, 1944

INVENTOR
H. L. THOMPSON
BY [signature]
ATTORNEY.

Patented Feb. 25, 1947

2,416,502

UNITED STATES PATENT OFFICE 2,416,502

FIFTH WHEEL FOR VEHICLES

Herried L. Thompson, Portland, Oreg.

Application October 25, 1944, Serial No. 560,219

1 Claim. (Cl. 280—33.1)

This invention relates generally to land travelling vehicles, and particularly to a fifth wheel for vehicles.

The main object of this invention is to provide a universal joint support as a part of the fifth wheel mechanism in which the wear is uniformly distributed over the entire surface of the joint, whereby the parts may be kept in close relationship without excessive friction or wear being produced.

The second object is to construct a fifth wheel of the class described which will be simple to build and not easily rendered inoperative by wear or use.

I accomplish these and other objects in the manner set forth in the following specification, as illustrated in the accompanying drawing, in which.

Similar numerals refer to similar parts throughout the several views.

Figure 2:
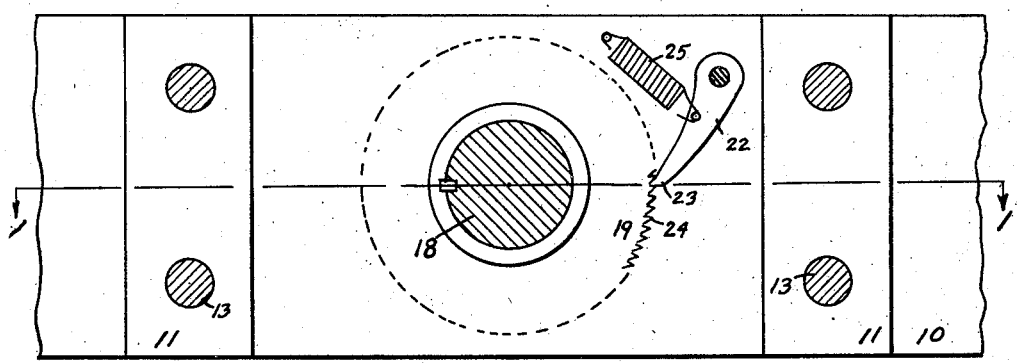
Fig. 2 is a horizontal section taken along the line 2—2 in Fig. 1.
Figure 1:
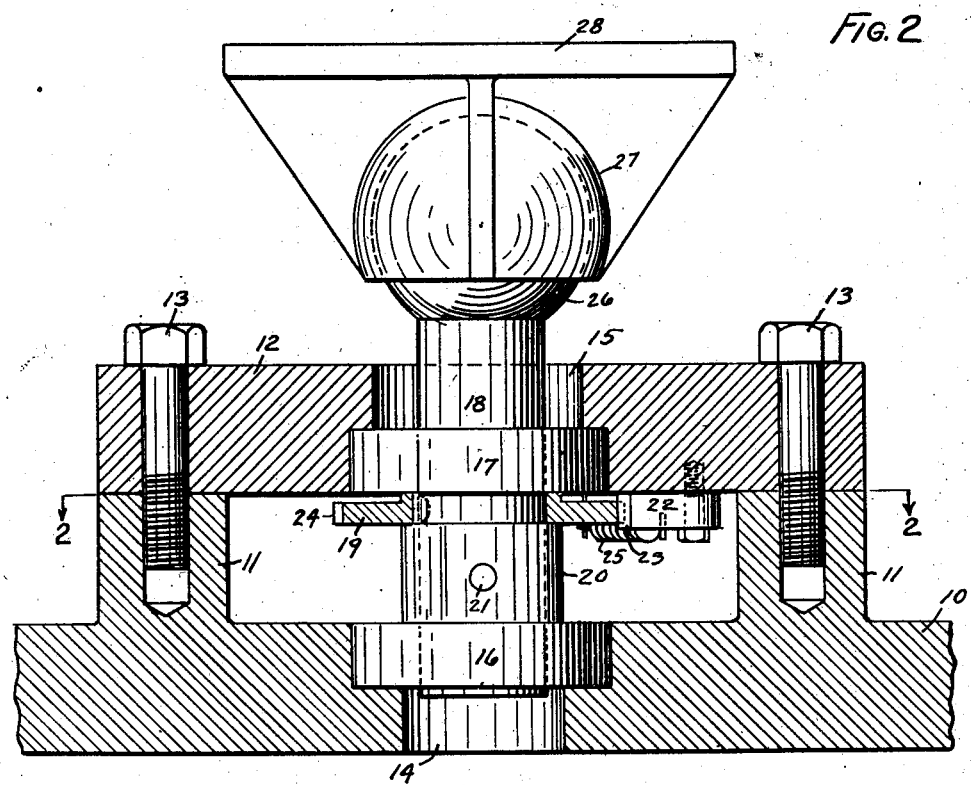
Fig. 1 is a vertical section through the device taken along the line 1—1 in Fig. 2.

Referring in detail to the drawing, there is shown a base 10, adapted to be mounted on a vehicle body (not shown), upon which it is desired to support a bolster or one end of a vehicle body.

On the base 10 are formed the standards 11 across which is mounted a cap 12 held in place by means of the cap screws 13. Mounted in counterbored recesses 14 and 15 in the base 10 and cap 12 are the combined radial and end thrust anti-friction bearings 16 and 17, preferably of the roller type.

Journalling in the bearings 16 and 17 is the vertical spindle 18 upon which is keyed a ratchet wheel 19 on the under side of the bearing 17. The enlarged spindle portion 20 may either be a sleeve secured on the spindle 18 by means of a pin 21, or it may be otherwise secured against endwise movement in order that the load may be transferred from the spindle 18 to the bearing 16.

Mounted on the under side of the cap 12 is a pawl 22 whose point 23 engages the ratchet teeth 24 of the ratchet wheel 19. A spring 25 urges the pawl point 23 toward the teeth 24.

On the upper end of the spindle 18 is mounted a spherical head 26 which fits into the socket 27 of the joint casting 28 which is normally secured to the under side of the trailer chassis or other contrivance being supported by the fifth wheel.

The operation of the device is as follows:

As the vehicle on which the device is used turns, it naturally causes the spindle 18 to turn in the bearings 16 and 17, but this turn can only be made in one direction on account of the pawl 22. The net result of this is to insure an intermittent rotation of the spindle 18 in one direction only, thereby insuring the uniform wearing of the spherical member 36 and the member 27.

While I have thus illustrated and described my invention, it must be understood that I do not intend to be limited to the precise form illustrated therein, but I do intend to cover all such forms and modifications of the device as falls fairly within the appended claim.

I claim:

In a device of the class described, the combination of a horizontal base having a pair of upright standards on its upper side spaced from each other, a cap extending across said standards, anti-friction thrust bearings mounted in said base and cap in vertical alinement with each other, a spindle mounted in said bearings having a thrust collar therebetween, a ratchet wheel secured to said spindle, a pawl engaging said ratchet whereby said spindle may turn in one direction only, and a ball and socket joint on the upper end of said spindle whereby a load may be supported thereon.

HERRIED L. THOMPSON.

REFERENCES CITED

The following references are of record in the file of this patent:

UNITED STATES PATENTS

| Number | Name | Date |
|---|---|---|
| 1,986,149 | Harris | Jan. 1, 1935 |
| 1,587,074 | Humphry | June 1, 1926 |
| 1,574,470 | Coffee | Feb. 23, 1926 |